United States Patent
Li et al.

(10) Patent No.: US 6,799,299 B1
(45) Date of Patent: Sep. 28, 2004

(54) METHOD AND APPARATUS FOR CREATING STYLESHEETS IN A DATA PROCESSING SYSTEM

(75) Inventors: Yongcheng Li, Raleigh, NC (US); Yih-Shin Tan, Raleigh, NC (US); Leonard Douglas Tidwell, II, Raleigh, NC (US); Ajamu A. Wesley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/404,528

(22) Filed: Sep. 23, 1999

(51) Int. Cl.[7] .............................................. G06F 15/00
(52) U.S. Cl. ........................ 715/513; 715/523; 715/530
(58) Field of Search ................................ 715/513, 530, 715/523; 707/203

(56) References Cited

U.S. PATENT DOCUMENTS

| | | | | |
|---|---|---|---|---|
| 6,023,714 A | * | 2/2000 | Hill et al. ..................... 715/513 |
| 6,209,124 B1 | * | 3/2001 | Vermeire et al. ............ 717/114 |
| 6,279,015 B1 | * | 8/2001 | Fong et al. ................... 715/523 |
| 6,336,124 B1 | * | 1/2002 | Alam et al. ................... 715/523 |
| 6,487,566 B1 | * | 11/2002 | Sundaresan ................... 715/513 |
| 6,507,857 B1 | * | 1/2003 | Yalcinalp ...................... 715/513 |
| 6,535,896 B2 | * | 3/2003 | Britton et al. ............... 715/523 |
| 6,609,133 B2 | * | 8/2003 | Ng et al. ................. 707/103 Y |

* cited by examiner

*Primary Examiner*—Joseph Feild
*Assistant Examiner*—Rachna Singh
(74) *Attorney, Agent, or Firm*—Duke W. Yee; Jerry W. Herndon; Stephen J. Walder, Jr.

(57) ABSTRACT

A method and apparatus in a data processing system for converting documents. Source elements and corresponding target elements are identified. An initial target document derived from a source document is presented using the source elements and corresponding target elements. User input is received modifying presentation of the initial target document to form a final target document. Differences between the initial target document and the final target document are identified. A stylesheet is created to convert source documents into target documents using the identified source elements and corresponding target elements and the identified differences between the initial target document and the final target document.

34 Claims, 20 Drawing Sheets

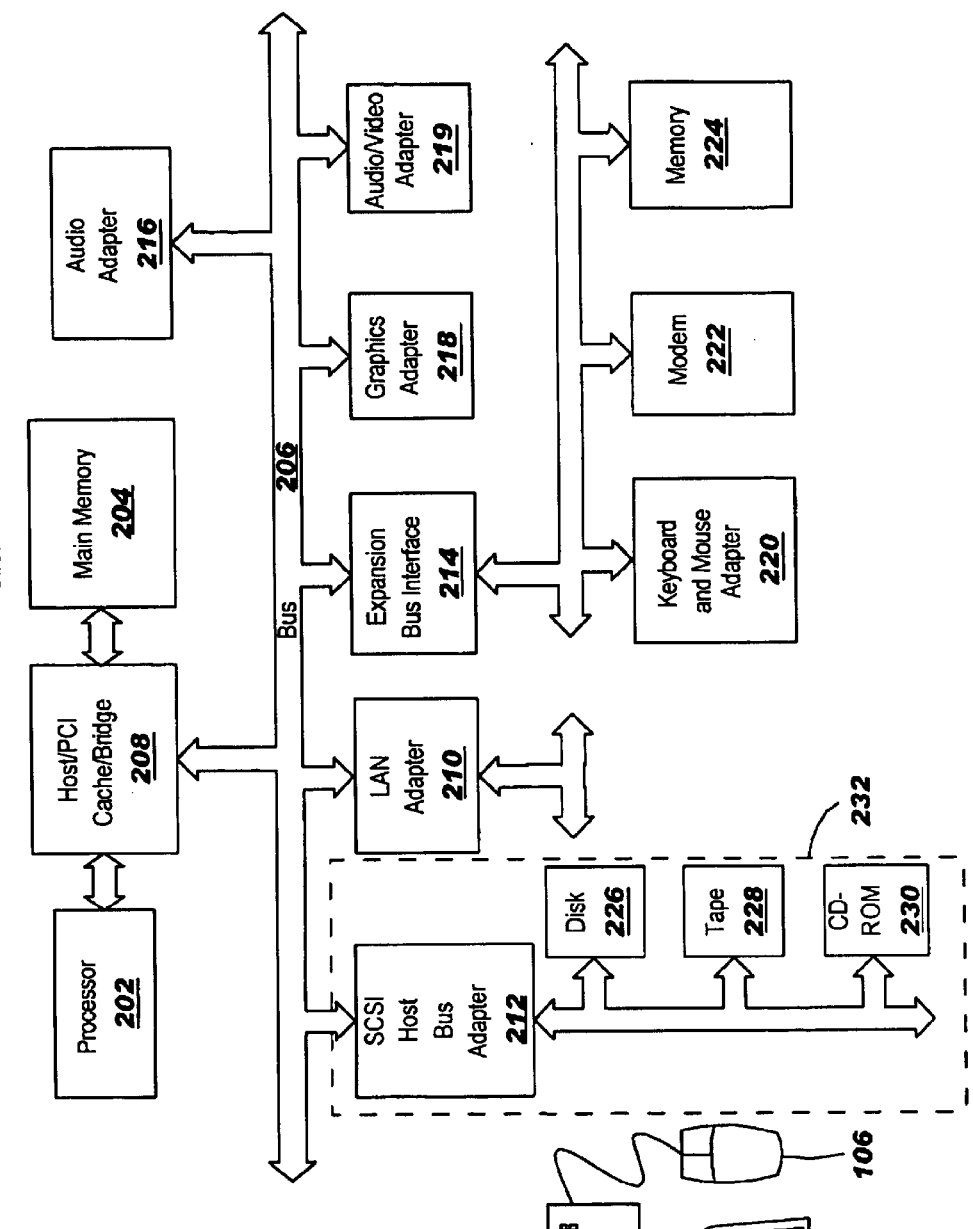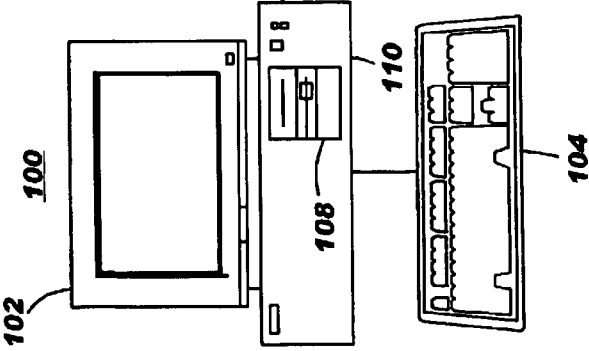

FIG. 7

```
<?xml version="1.0" encoding="ISO-8859-1"?>

<employee_record>
 <personal_data>
  <lastname>Smith</lastname>
  <firstname>John</firstname>
  <serialnumber>888888</serialnumber>
  <phone>(919) 666-5555</phone>
  <email>jsmith@us.ibm.com</email>
 </personal_data>
 <personal_data>
  <lastname>Martin</lastname>
  <firstname>Judy</firstname>
  <serialnumber>666666</serialnumber>
  <phone>(919) 555-6666</phone>
  <email>jmartin@us.ibm.com</email>
 </personal_data>
</employee_record>
```

702 — first personal_data block
704 — second personal_data block
700 — entire record

FIG. 9

```
<employee_record_table>  902
  <personal_data_tr>  904
    <lastname_td><xml_data>Smith</xml_data></lastname_td>
    <firstname_td><xml_data>John</xml_data></firstname_td>
    <serialnumber_td><xml_data>888888</xml_data></serialnumber_td>
    <phone_td><xml_data>(919) 666-5555</xml_data></phone_td>
    <email_td><xml_data>jsmith@us.ibm.com</xml_data></email_td>
  </personal_data_tr>  904     906
  <personal_data_tr>  904
    <lastname_td><xml_data>Martin</xml_data></lastname_td>
    <firstname_td><xml_data>Judy</xml_data></firstname_td>
    <serialnumber_td><xml_data>666666</xml_data></serialnumber_td>
    <phone_td><xml_data>(919) 555-6666</xml_data></phone_td>
    <email_td><xml_data>jmartin@us.ibm.com</xml_data></email_td>
  </personal_data_tr>  904     908
</employee_record_table>  902
```

HTML Title:

<user_tag_title>
  <user_tag_data>
    ... ...
  </user_tag_data>
</user_tag_title>

HTML Paragraph:

<user_tag_paragraph>
  <user_tag_data>
    ... ...
  </user_tag_data>
</user_tag_paragraph>

HTML Table:

<user_tag_table>
  <user_tag1_tr>
    <user_tag2_td>
      <user_tag3_data>
        ... ...
      </user_tag3_data>
    </user_tag2_td>
  </user_tag1_tr>
</user_tag_table>

HTML Checkbox:

<user_tag_checkbox>
  <user_tag1_checkbox_item>
    <user_tag3_data>
      ... ...
    </user_tag3_data>
  </user_tag1_checkbox_item>
</user_tag_checkbox>

<HTML>
         <employee_record_table>————————1104
    ┌─    <TABLE>
    │   ┌─  <personal_data_tr>
    │   │     <TR>⌒⌒1108
    │   │  ┌─ <lastname_td>
    │  1110│    <TD><xml_data>Smith</xml_data></TD>
    │   │  └─ </lastname_td>
    │   │     <firstname_td>
    │   │        <TD><xml_data>John</xml_data></TD>
    │   │     </firstname_td>
    │  1106   <serialnumber_td>
    │   │        <TD><xml_data>888888</xml_data></TD>
    │   │     </serialnumber_td>
    │   │     <phone_td>
    │   │        <TD><xml_data>9196665555</xml_data></TD>
    │   │     </phone_td>
    │   │     <email_td>
    │   │        <TD><xml_data>jsmith@us.ibm.com</xml_data></TD>
    │   │     </email_td>
    │   │     </TR>——1108
   1102  └─  </personal_data_tr>
    │   ┌─  <personal_data_tr>
    │   │     <TR>——1108
    │   │     <lastname_td>
    │   │        <TD><xml_data>Martin</xml_data></TD>
    │   │     </lastname_td>
    │   │     <firstname_td>
    │   │        <TD><xml_data>Judy</xml_data></TD></firstname_td>
    │  1112   <serialnumber_td>
    │   │        <TD><xml_data>666666</xml_data></TD>
    │   │     </serialnumber_td>
    │   │     <phone_td>
    │   │        <TD><xml_data>9195556666</xml_data></TD>
    │   │     </phone_td>
    │   │     <email_td>
    │   │        <TD><xml_data>jmartin@us.ibm.com</xml_data></TD>
    │   │     </email_td>
    │   │     </TR>⌒1108
    │   └─  </personal_data_tr>
    └─    </TABLE>
         </employee_record_table>⌒1104
       </HTML>
```

```
<?xml version="1.0"?>
```

1202 — `<xsl:stylesheet xmlns:xsl="http://www.w3.org/TR/WD-xsl">`

1204
```
<xsl:template match="/">
    <xsl:apply-templates/>
</xsl:template>
```

1206
```
<xsl:template match="employee_record">
    <employee_record_table>
        <xsl:apply-templates/>
    </employee_record_table>
</xsl:template>
```

1208
```
<xsl:template match="personal_data">
    <personal_data_tr>
        <xsl:apply-templates/>
    </personal_data_tr>
</xsl:template>
```

1210
```
<xsl:template match="lastname">
    <lastname_td>
        <xml_data>
            <xsl:apply-templates/>
        </xml_data>
    </lastname_td>
</xsl:template>
```

1212
```
<xsl:template match="firstname">
    <firstname_td>
        <xml_data>
            <xsl:apply-templates/>
        </xml_data>
    </firstname_td>
</xsl:template>
```

FIG. 12
(cont'd)

```
         ┌  <xsl:template match="serialnumber">
         │     <serialnumber_td>
1214    ┤        <xml_data>
         │           <xsl:apply-templates/>
         │        </xml_data>
         │     </serialnumber_td>
         └  </xsl:template>

┌  <xsl:template match="phone">
         │     <phone_td>
1216    ┤        <xml_data>
         │           <xsl:apply-templates/>
         │        </xml_data>
         │     </phone_td>
         └  </xsl:template>

┌  <xsl:template match="email">
         │     <email_td>
1218    ┤        <xml_data>
         │           <xsl:apply-templates/>
         │        </xml_data>
         │     </email_td>
         └  </xsl:template>

</xsl:stylesheet>
```

```
<HTML>
   <body bgcolor="#CCFFCC">
1402   <br/>
       <br/>
       <p align="center">
          [<a href="home.html">Home</a>]
          [<a href="products.html">Products</a>]
1404      [<a href="documentations.html">Documentations</a>]
          [<a href="employee_records.html">Employee Records</a>]
          [<a href="support.html">Support</a>]
          [<a href="contact.html">Contact</a>]
       </p>
       <br/>
1406   <p align="center">
          <img src="RWB_LINE.gif" width="540" height="8"/>
       </p>
       <p align="center">
1408      <b><font color="#FF00FF">Employer Records</font></b>
       </p>
       <div align="center">
```

FIG. 14B

```
<employee_record_table>
  <TABLE border="2" bordercolor="#9999FF"bgcolor="#FFCCCC">
    <TR>
      <TH>Last Name</TH>
      <TH>First Name</TH>
      <TH>Serial Number</TH>
      <TH>Phone</TH>
      <TH>Email</TH>
    </TR>
    <personal_data_tr>
    <TR>
      <lastname_td>
      <TD>
        <font face="Arial, Helvetica, sans-serif">
        <xml_data>Smith</xml_data>
        </font>
      </TD>
      </lastname_td>
      <firstname_td>
      <TD>
        <font face="Arial, Helvetica, sans-serif">
          <xml_data>John</xml_data>
        </font>
      </TD>
      </firstname_td>
      <serialnumber_td>
      <TD>
        <font face="Arial, Helvetica, sans-serif">
          <xml_data>888888</xml_data>
        </font>
      </TD>
      </seiralnumber_td>
      <phone_td>
      <TD>
        <font face="Arial, Helvetica, sans-serif">
          <xml_data>(919) 666-5555</xml_data>
        </font>
      </TD>
      </phone_td>
      <email_td>
      <TD>
        <font face="Arial, Helvetica, sans-serif">
          <xml_data>jsmith@us.ibm.com</xml_data>
        </font>
      </TD>
      </email_td>
    </TR>
    </personal_data_tr>
```

Labels: 1410 (TR header block), 1412 (lastname_td), 1414 (firstname_td), 1416 (serialnumber_td), 1418 (phone_td), 1420 (email_td)

FIG. 14C

```
          ⎧  <personal_data_tr>
          ⎪  <TR>
          ⎪    <lastname_td>
   1422   ⎨    <TD>
          ⎪      <font face="Arial, Helvetica, sans-serif">
          ⎪        <xml_data>Martin</xml_data>
          ⎪      </font>
          ⎪    </TD>
          ⎪    </lastname_td>
          ⎪    <firstname_td>
          ⎪    <TD>
          ⎪      <font face="Arial, Helvetica, sans-serif">
          ⎪        <xml_data>Judy</xml_data>
          ⎪      </font>
          ⎪    </TD>
          ⎪    </firstname_td>
          ⎪    <serialnumber_td>
          ⎪    <TD>
          ⎪      <font face="Arial, Helvetica, sans-serif">
          ⎪        <xml_data>666666</xml_data>
          ⎪      </font>
          ⎪    </TD>
          ⎪    </serialnumber_td>
          ⎪    <phone_td>
          ⎪    <TD>
          ⎪      <font face="Arial, Helvetica, sans-serif">
          ⎪        <xml_data>(919) 555-6666</xml_data>
          ⎪      </font>
          ⎪    </TD>
          ⎪    </phone_td>
          ⎪    <email_td>
          ⎪    <TD>
          ⎪      <font face="Arial, Helvetica, sans-serif">
          ⎪        <xml_data>jmartin@us.ibm.com</xml_data>
          ⎪      </font>
          ⎪    </TD>
          ⎪    </email_td>
          ⎪  </TR>
          ⎪  </personal_data_tr>
          ⎪  </TABLE>
          ⎩ </employee_record_table>
```

FIG. 14D

```
        ⎡ <br/>
1424  ⎨ <p>
        ⎢     <img src="RWB_LINE.gif" width="540" height="8"/>
        ⎢ </p>
        ⎣ <br/>
        ⎡ <p>
1426  ⎨     <font face="Courier New, Courier, mono" color="#0080C0">
        ⎢       <b>
        ⎢         <font color="#00FF00">COPYRIGHT ABCEDFG.COM
        ⎢                    <i>4/14/1999</i></font>
        ⎢       </b>
        ⎢     </font>
        ⎢   </p>
        ⎢ </div>
        ⎢ </body>
        ⎣ </HTML>
```

1502 {
```
<?xml version="1.0"?>

<xsl:stylesheet xmlns:xsl="http://www.w3.org/TR/WD-xsl">

<xsl:template match="/">
   <xsl:apply-templates/>
</xsl:template>
```

1504 {
```
<xsl:template match="employee_record_table">
   <HTML>
   <body bgcolor="#CCFFCC">
   <br/>
   <br/>
   <p align="center">
      [<a href="trans2.html">Home</a>]
      [<a href="trans2.html">Products</a>]
      [<a href="trans2.html">Documentations</a>]
      [<a href="trans2.html">Employee Records</a>]
      [<a href="trans2.html">Support</a>]
      [<a href="trans2.html">Contact</a>]
   </p>
   <br/>
   <p align="center">
      <img src="RWB_LINE.gif" width="540" height="8"/>
   </p>
   <p align="center">
      <b><font color="#FF00FF">Employer Records</font></b>
   </p>
   <div align="center">
    <employee_record_table>
```

FIG. 15A
(cont'd)

```
1506  ⎧  <TABLE border="2" bordercolor="#9999FF" bgcolor="#FFCCCC">
      ⎪    <TR>
      ⎪      <TH>Last Name</TH>
      ⎪      <TH>First Name</TH>
      ⎪      <TH>Serial Number</TH>
      ⎪      <TH>Phone</TH>
      ⎪      <TH>Email</TH>
      ⎪    </TR>
      ⎪    <xsl:apply-templates/>
      ⎨  </TABLE>
      ⎪  </employee_record_table>
      ⎪  <br/>
      ⎪  <p><img src="RWB_LINE.gif" width="540" height="8"/></p>
      ⎪  <br/>
      ⎪  <p>
      ⎪    <font face="Courier New, Courier, mono" color="#0080C0">
      ⎪      <b>
      ⎪        <font color="#00FF00">COPYRIGHT ABCEDFG.COM <i>4/14/1999</i>
      ⎪        </font>
      ⎪      </b>
      ⎪    </font>
      ⎪  </p>
      ⎪  </div>
      ⎪  </body>
      ⎪  </HTML>
      ⎩ </xsl:template>
```

FIG. 15B

```
1508  <xsl:template match="personal_data_tr">
        <TR>
            <xsl:apply-templates/>
        </TR>
      </xsl:template>

<xsl:template match="lastname_td">
        <TD>
          <font face="Arial, Helvetica, sans-serif">
            <xsl:apply-templates/>
          </font>
        </TD>
      </xsl:template>

<xsl:template match="firstname_td">
        <TD>
          <font face="Arial, Helvetica, sans-serif">
            <xsl:apply-templates/>
          </font>
        </TD>
      </xsl:template>

<xsl:template match="serialnumber_td">
        <TD>
          <font face="Arial, Helvetica, sans-serif">
            <xsl:apply-templates/>
          </font>
        </TD>
      </xsl:template>

<xsl:template match="phone_td">
        <TD>
          <font face="Arial, Helvetica, sans-serif">
            <xsl:apply-templates/>
          </font>
        </TD>
      </xsl:template>

<xsl:template match="email_td">
        <TD>
          <font face="Arial, Helvetica, sans-serif">
            <xsl:apply-templates/>
          </font>
        </TD>
      </xsl:template>

<xsl:template match="xml_data">
        <xsl:apply-templates/>
      </xsl:template>

</xsl:stylesheet>
```

US 6,799,299 B1

METHOD AND APPARATUS FOR CREATING STYLESHEETS IN A DATA PROCESSING SYSTEM

BACKGROUND OF THE INVENTION

1. Technical Field

The present invention provides an improved data processing system and in particular a method and apparatus for processing documents. Still more particularly, the present invention provides a method and apparatus for creating stylesheets for documents.

2. Description of Related Art

Extensible markup language (XML) is fast becoming a powerful replacement for hypertext markup language (HTML). Both are based on standard generalized markup language (SGML), but XML provides a way to describe an arbitrary tag set. Since XML does not describe how to display a document marked up with arbitrary elements, some style information must be associated with XML to know how to display the document. This mechanism is different from HTML in which all elements are determined by standards so any browser knows how to display the data.

Extensible stylesheet language (XSL) is an XML vocabulary for defining stylesheets. Part of the family of emerging XML standards, XSL defines a mechanism for converting a document type into another one. Advantages are present for the separation of style from content. For example, styles can be standardized and reused for different applications. Also, the separation of style from content makes it possible to apply multiple styles to the same document. Further, content authors do not have to worry about style issues with this type of system.

Although a great deal of expressive power is present in XSL, this power comes at a price. The mechanics of building templates requires a considerable amount of expertise and scripting skills. To further complicate matters, because XSL is a declarative language, many programmers of traditional programming languages face a significant amount of training as they begin to work with XSL. Besides, even if a programmer can handle XSL, the development process can be time consuming and error prone at times. Finally, it is hard to keep up with many different target document styles that a manual XSL stylesheet development process must deal with.

Two primary approaches to designing a style markup language exist. These two approaches are procedural and declarative. Using a procedural approach, the programmer defines what is to be done, often using a scripting language. Using a declarative approach, the programmer only needs to describe the characteristics and constraints to be obeyed and not be so concerned with "how" it is done. XSL uses a declarative approach to designing stylesheets. Unfortunately many programmers are unfamiliar with a declarative style of programming, a need exists for an easier way to implement XSL stylesheets.

SUMMARY OF THE INVENTION

The present invention provides a method and apparatus in a data processing system for converting documents. Source elements and corresponding target elements are identified. An initial target document derived from a source document is presented using the source elements and corresponding target elements. User input is received modifying presentation of the initial target document to form a final target document. Differences between the initial target document and the final target document are identified. A stylesheet is created to convert source documents into target documents using the identified source elements and corresponding target elements and the identified differences between the initial target document and the final target document.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation depicting a data processing system in which the present invention may be implemented;

FIG. 2 is a block diagram illustrating a data processing system in which the present invention may be implemented;

FIG. 7 is a diagram illustrating a sample input XML file depicted in accordance with a preferred embodiment of the present invention;

FIG. 9 is a diagram illustrating an intermediate form of an intermediate XML document in the conversion process depicted in accordance with a preferred embodiment of the present invention;

FIG. 10 is a diagram illustrating intermediate tags depicted in accordance with a preferred embodiment of the present invention;

FIG. 11 is an example of an initial HTML document converted from a XML document depicted in accordance with a preferred embodiment of the present invention;

FIG. 12 is an XSL stylesheet automatically generated based on the HTML file in FIG. 9 depicted in accordance with a preferred embodiment of the present invention;

FIGS. 14A–14D is an illustration of HTML code depicted in accordance with a preferred embodiment of the present invention;

FIGS. 15A and 15B are diagrams of an XSL stylesheet depicted in accordance with a preferred embodiment of the present invention.

DETAILED DESCRIPTION OF THE PREFERRED EMBODIMENT

Figure 3:
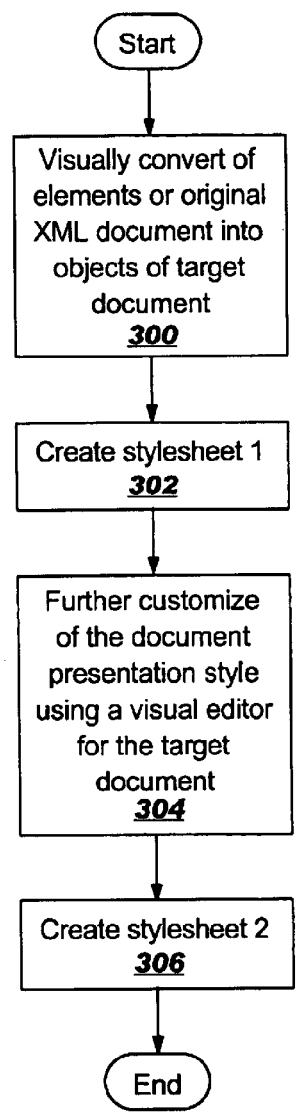
FIG. 3 is a high level flowchart of a process for generating an XSL stylesheet depicted in accordance with a preferred embodiment of the present invention.

With reference now to the figures and in particular with reference to FIG. 1, a pictorial representation depicting a data processing system in which the present invention may be implemented in accordance with a preferred embodiment of the present invention. A personal computer 100 is depicted which includes a system unit 110, a video display terminal 102, a keyboard 104, storage devices 108, which may include floppy drives and other types of permanent and removable storage media, and mouse 106. Additional input devices may be included with personal computer 100. Personal computer 100 can be implemented using any suitable computer, such as an IBM Aptiva™ computer, a product of International Business Machines Corporation, located in Armonk, N.Y. Although the depicted representation shows a personal computer, other embodiments of the present invention may be implemented in other types of data processing systems, such as network computers, Web based television set top boxes, Internet appliances, etc. Computer 100 also preferably includes a graphical user interface that may be implemented by means of systems software residing in computer readable media in operation within computer 100. With reference now to FIG. 2, a block diagram illustrating a data processing system in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Micro Channel and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device which is configured with ROM and/or flash ROM in order to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The present invention provides a method, apparatus, and instructions for creating stylesheets. The process of the present invention includes the use of visual tools as part of the process of creating stylesheets. The user selects elements of an original XML document and formats and converts them into objects for the target document. Once the objects of the target document are created, a visual editor for the target document may be used to further customize the presentation style of the document. The conversion of the basic XML elements may be reused many times for different customization styles. This mechanism simplifies the process of creating multiple sytlesheets and making the integration of multiple XML documents easier. The present invention does not require users to have a great deal of knowledge about the source document type or the target document type.

With reference now to FIG. 3, a high level flowchart of a process for generating an XSL stylesheet is depicted in accordance with a preferred embodiment of the present invention. The process beings by visually converting elements of the original XML document into objects of a target document (step 300). Step 300 involves translating the original XML documents into an intermediate tagged form for further processing. Basically, the user selects the basic elements of the original XML documents and then formats and converts the elements into objects of the target document. An intermediate XSL stylesheet is created (step 302). This stylesheet is able to perform straight forward tag conversion. When all of the objects of the original document have been converted into objects of the target document, customization of the document presentation style occurs using a visual editor for the target document (step 304). An XSL stylesheet is generated from the intermediate tagged form created in step 300 (step 306) with the process terminating thereafter.

Figure 4:
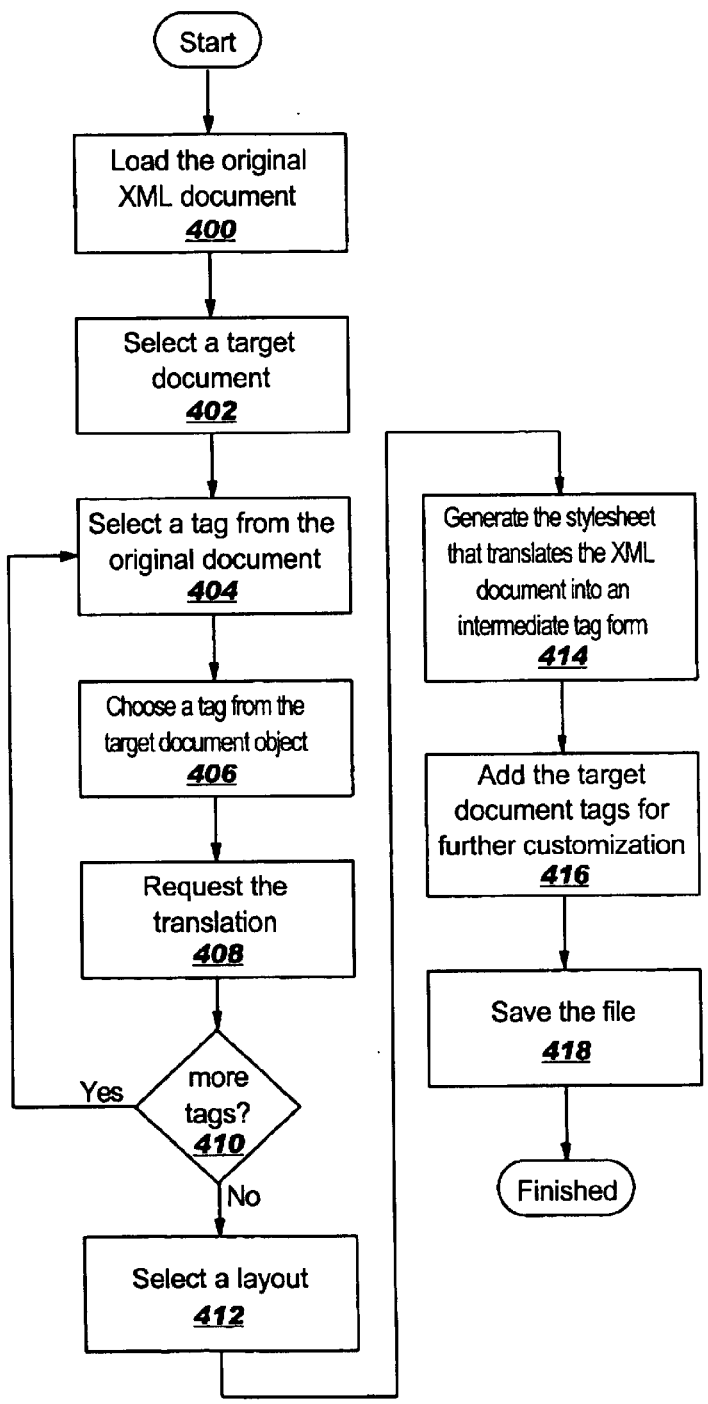
FIG. 4 is a flowchart showing the translation of the original document into an intermediate tagged form depicted in accordance with a preferred embodiment of the present invention.

Referring now to FIG. 4, a flowchart showing the translation of the original document into an intermediate tagged form is depicted in accordance with a preferred embodiment of the present invention. FIG. 4 is a more detailed description of step 300 in FIG. 3. The original XML (Extensible Markup Language) document is loaded (step 400) and a target document is selected (step 402). In the depicted example, the target document will be hypertext markup language (HTML), but other target languages may be used. The original XML document will typically contain many tagged objects. A tag is chosen from the original document (step 404) and associated with a tag in the target document (step 406). The selected translation is performed (step 408).

A determination is then made as to whether additional unprocessed tags are present in the original document (step 410). If more unprocessed tags are present for translation then the process returns to step 404 with the selection of another unprocessed tag. Otherwise, a layout is selected (step 412). A stylesheet that uses intermediate tags is generated based on the layout. This stylesheet is one that will translate an XML document into a document containing intermediate tags (step 414). The target document tags from the XML objects are added (step 416). The complete document in intermediate tagged form is saved (step 418) with the process terminating thereafter.

Figure 5:
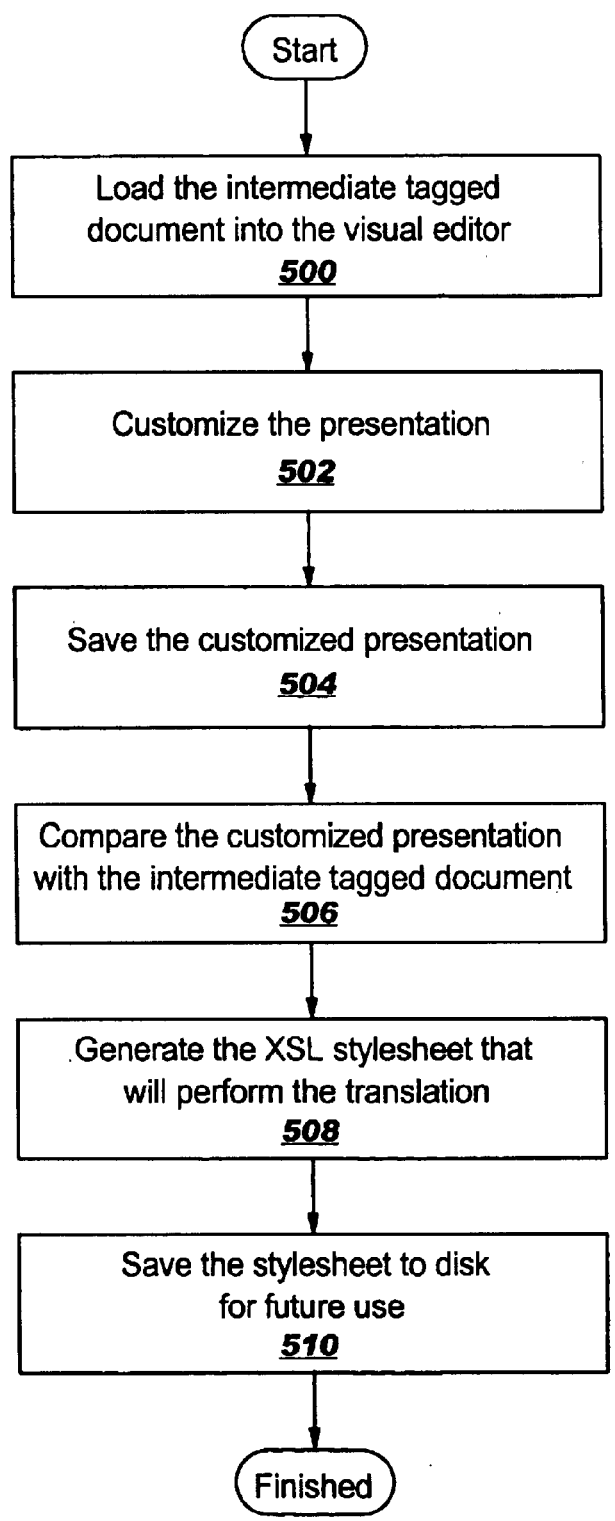
FIG. 5 is a flowchart of a process to generate an intermediate tagged form document into an XSL stylesheet depicted in accordance with a preferred embodiment of the present invention.

Referring now to FIG. 5, a flowchart of a process to generate an intermediate tagged form document into an XSL stylesheet is depicted in accordance with a preferred embodiment of the present invention. FIG. 5 is a more detailed description of step 302 in FIG. 3.

The document in intermediate tagged form is loaded into the visual editor (step 500). This visual editor allows the user to see the document in its present form after processing in step 300 of FIG. 3. The visual editor is one that is designed for editing the particular type of document, such as, for example, an HTML editor. At this time, user input customizing the presentation of the document is received (step 502). When completed, the customized stylesheet is saved (step 504). A comparison of the customized stylesheet with the intermediate tagged document is made (step 506). The two stylesheets are merged and an XSL stylesheet is generated that may be used to perform the translation from the original XML document into the desired style (step 508). This XSL stylesheet is saved for future use on XML data in the same format (step 510) with the process terminating thereafter.

Figure 6:
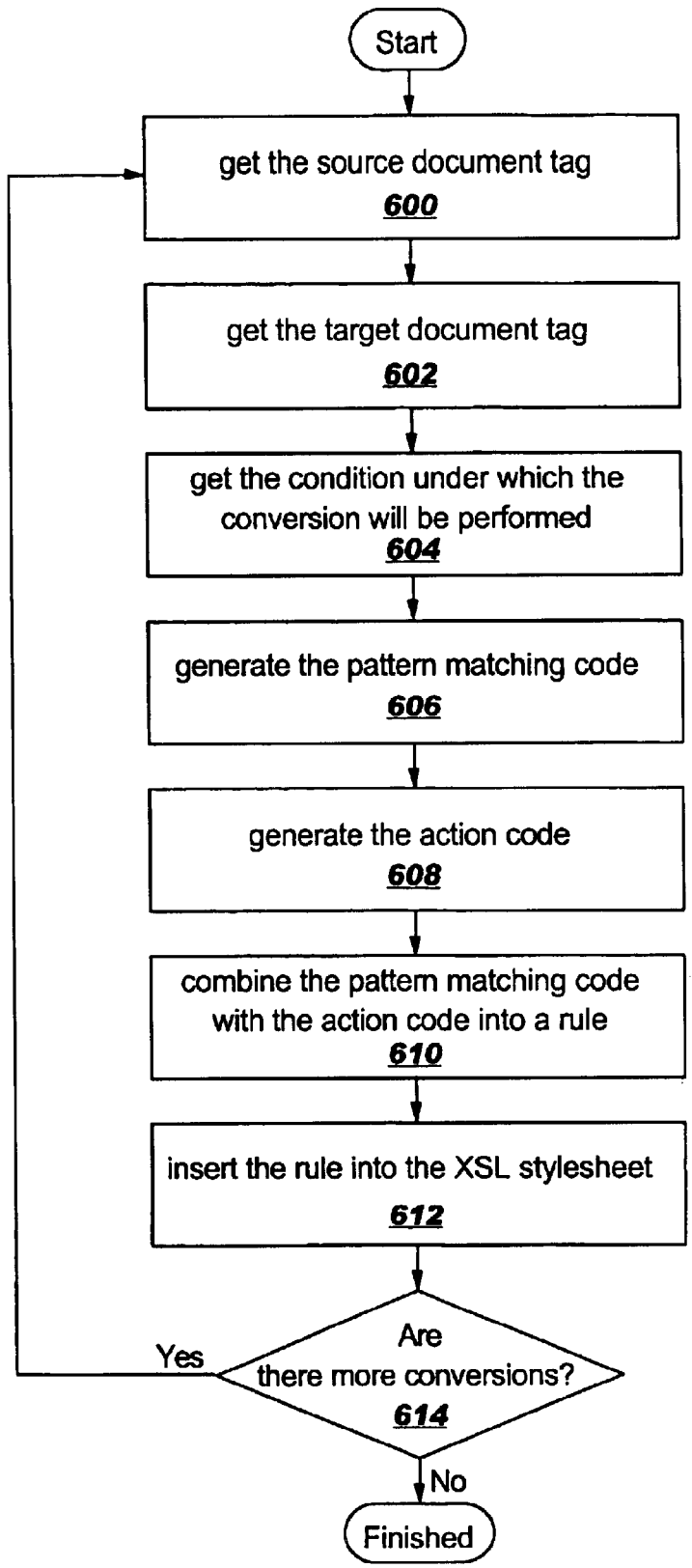
FIG. 6 is a flowchart of a tag conversion process depicted in accordance with a preferred embodiment of the present invention.

With reference now to FIG. 6, a flowchart of a tag conversion process is depicted in accordance with a preferred embodiment of the present invention. The user first selects the source document tag (step 600). In this example, the source document tag is selected from input using a XML document tree as illustrated in FIG. 7. The user also selects the target document tag (step 602). The condition under which the conversion will be performed is determined next (step 604). A XSL stylesheet contains a set of rules, which are basic units to perform the data conversion. Two parts are present in each rule. One part is pattern matching, and the other part is action. In the pattern matching part, the features are specified to determine on which elements the action is to be performed. XSL specification specifies the syntax of the pattern matching code. Usually, the name of the element on which the conversion is to be performed is provided. In addition to the tag name, conditions may be specified. These conditions may be, for example, first-of-type, last-of-type, an element with a particular attribute value, and an element which has a particular ancestor or descendant. Pattern matching code is generated (step 606) and action code is generated (step 608). Pattern matching code is the XSL stylesheet code, which defines the pattern matching condition. This code specifies the element on which the conversion is to be performed. The action code is the XSL stylesheet code which describes the target data format. For example, it identified the kind of conversion to perform once the desired element is found. In other words, the conditions or the pattern matching statements. The pattern matching code and the action code are combined to form a rule (step 610). This rule is inserted into the XSL stylesheet (step 612). A determination is then made as to whether additional conversions are required (step 614). If additional conversions are required, the process returns to step 600. Otherwise, the process terminates.

To understand the operation of the stylesheet generation process in detail, an example stylesheet generation is presented in the discussion of FIGS. 7–15. The process begins with an XML document that the user wants to transform into another document type. To automate this process for any number of similarly-structured XML documents, the user wants to create an XSL stylesheet. Once the stylesheet is developed, any XML document conforming to the original Document Type Definition (DTD) may be automatically converted to the desired document type by applying the stylesheet.

Presently available methods require the user to know a great deal about the original document, the XSL, and the DTDs of the original document and the target document. The present invention provides a visual, non-programming method to implement the conversion.

The first step of this approach is to let the user visually select the elements of the original XML document into a structured layout such as a table and convert it to the objects of the target document. A stylesheet is automatically generated after the user finishes the conversion. The stylesheet is applied to the original XML document through a stylesheet processing engine to convert it to the target document. The target document is fed into a visual editor of the target document. The user can freely customize the presentation of the document in the visual editor with document type specific format. When the user finishes the editing, as a final step, the originally converted document is compared to the result document. A second stylesheet is generated based on the sample transformation performed by the user. Those two generated stylesheets can be combined to perform future document conversion.

Turning now to FIG. 7, a diagram illustrating a sample input XML file is depicted in accordance with a preferred embodiment of the present invention. Two ways exist to provide the initial XML document for the first step of conversion without requiring a live XML document as input. One is to construct several sample XML documents from the DTD. The other is to utilize the DTD directly by parsing the tags into an element tree to form an XML template. This method works on XML tag definitions without any assumptions on content specific filtering.

FIG. 7 shows an input XML file 700 with two employee records 702 and 704. The personal_data contains the lastname, firstname, serialnumber, phone and email for John Smith in record 702 and Judy Martin in record 704.

Figure 8:
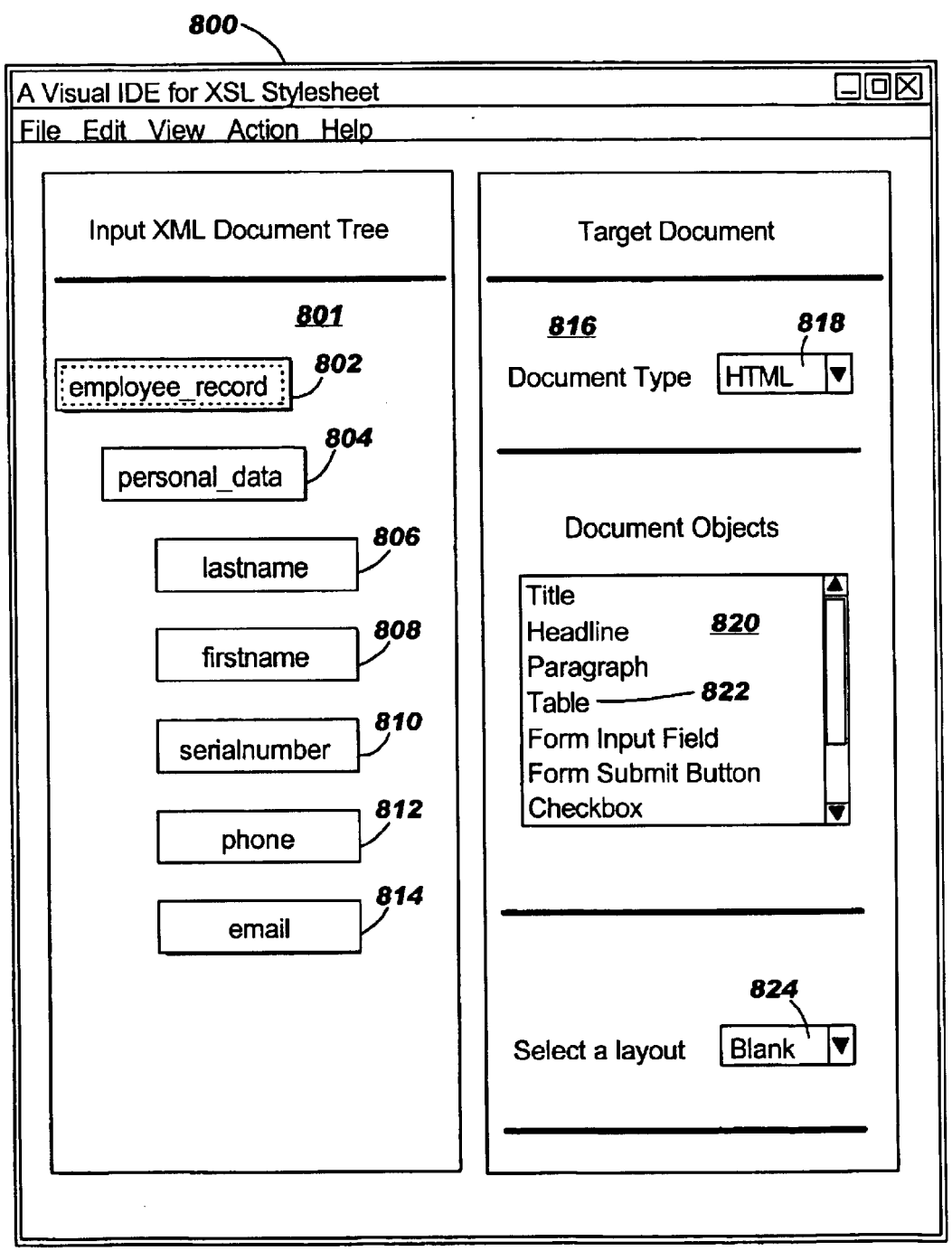
FIG. 8 is a snapshot of the visual display for the sample data in FIG. 7 and the conversion options depicted in accordance with a preferred embodiment of the present invention.

After the data file in FIG. 7 is input, the user interface appears as in FIG. 8. In window 800, section 801 contains a document tree based on the parse of the XML tags. In this case, an employee_record is illustrated. Employee_record 802 contains personal_data 804 in this tree. Personal_data includes tags for lastname 806, firstname 808, serialnumber 810, phonenumber 812, and email 814. In section 816 of window 800, a place for user input to specify characteristics of the target document are shown. Section 816 includes a document_type field 818. In this example, the document_type is HTML. Other types of documents also may be used as target documents, for example, portable document format (PDF). Target document section 816 also includes a document_objects field 820. This field may be used to select different possible tags in the target documents. In this example, the type table 822 would be selected for the employee_record 802. Such a selection will result in the data shown in section 802 being placed in a two-dimension array with rows corresponding to different people and the columns corresponding to the fields lastname 806, firstname 808, serialnumber 810, phonenumber 812, and email 814. After each of the tags has been associated with an object, a layout may then be selected in window 800 in field 824. In this case, the selected layout is blank.

The mapping performed between the source document, XML file 700 in FIG. 7, and the target document is shown below in FIG. 9 converts each personal data element into a row in a table. The last name, first name, serial number, phone, and email elements are mapped into columns in the table. After the selections to window 800 are finished, two documents are generated. One document is an intermediate XML document while the other document is an initial HTML document.

With reference now to FIG. 9, a diagram illustrating an intermediate form of an intermediate XML document in the conversion process is depicted in accordance with a preferred embodiment of the present invention. FIG. 9 shows a new XML file 900 generated after the conversion of the input data from FIG. 7 to table format. This document is independent of the document type and may be further converted into other document types.

The main tags are <employee_record_table>902. The data across each row of the table is tagged using <personal_data_tr>904, an intermediate tag, as shown in sections 906 and 908 for John Smith and Judy Martin. Additional intermediate tags with the suffix "_td" have been added to each of the data fields. The flexibility of the XSL stylesheet generator is accomplished by using intermediate tags.

With reference to FIG. 10, a diagram illustrating intermediate tags is depicted in accordance with a preferred embodiment of the present invention. FIG. 10 provides examples of intermediate tags in addition to the ones already discussed. These tags are for temporary, internal use only. These tags are formed by combining the user tag from the original XML document with a suffix based on the target object selected by the user. These tags make it easier to automatically generate the second XSL stylesheet.

With reference now to FIG. 11, an example of an initial HTML document converted from a XML document is depicted in accordance with a preferred embodiment of the present invention. HTML file 1100 corresponding to the XML file 900 in FIG. 9 is shown in FIG. 11. The <HTML> tags contain an employee_record_table 1102 whose data is enclosed by <TABLE> tags 1104. The personal data in section 1106 forms a row, so it is enclosed in <TR> (table row) tags 1102. Each item in the row is enclosed in <TD> (table data) tags 1108, as shown for the last name in section 1110. The other fields in the row are enclosed in a similar manner. The next row of personal data in section 1112 has a similar structure.

Although the HTML code shown in FIG. 11 illustrates only two records for John Smith and Judy Martin, other numbers of records may be used.

With reference now to FIG. 12, an XSL stylesheet automatically generated based on the HTML file in FIG. 9 is depicted in accordance with a preferred embodiment of the present invention. The formatting of data in FIG. 12 is the same for each record and is repeated for each record in the document. The motivation for XSL stylesheets is to abstract this information so that it only has to be provided once for each tag and not once for each actual data item. XSL style sheet 1200 is generated to convert XML file 700 in FIG. 7 to XML file 900 in FIG. 9.

XSL stylesheet 1200 for this particular set of tags is shown in FIG. 12. Link 1202 points to the World Wide Web Consortium (w3) technical report (TR) for the latest specification of Extensible Stylesheet Language (XSL). These rules are in declarative format, meaning that if the template is matched, then the appropriate style is applied. The pattern only has to be specified once for each data tag. At the root level ("/") the rule is to apply all available templates as shown in section 1202. For an "employee_record" all templates are applied for the tag employee_record_table in section 1206. Section 1206 includes a condition that is the element having the name "employee_record". This condition and other conditions may be used as pattern matching statements as described above. In a similar manner, for personal_data all templates are applied for the tag personal_data_tr in section 1208. The five data fields, "lastname" 1210, "firstname" 1212, "serialnumber" 1214, "phone" 1216, and "email" 1218 are handled in a similar manner. Although the XSL code 1200 in FIG. 12 appears to be even longer than the original HTML code 1100 in FIG. 11, code 1200 in FIG. 12 is independent of the actual number of employee records. In other words, XSL code 1200 would not increase in size even if additional records are processed. On the other hand, HTML code 1100 in FIG. 11 would grow linearly in size with the number of data records.

Figure 13:
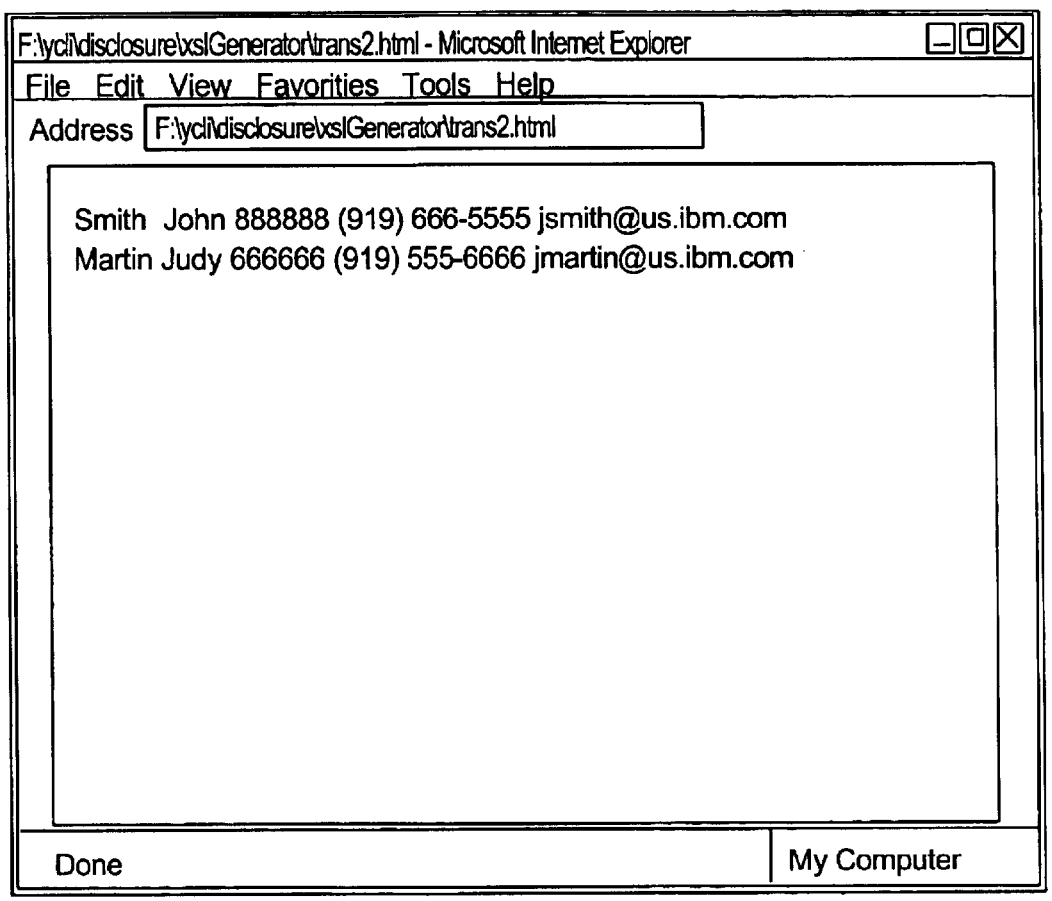
FIG. 13 is an illustration of a window displayed after selection of a target document for an XML document depicted in accordance with a preferred embodiment of the present invention.

Turning now to FIG. 13, an illustration of a window displayed after selection of a target document for an XML document is depicted in accordance with a preferred embodiment of the present invention. Window 1300 illustrates an HTML document displayed, which may be customized by a user. In particular, this HTML document is HTML file 1100 in FIG. 11. The document in window 1300 is "plain" and looks like text as opposed to a table. This document can be customized to add features for a table.

Turning now to FIGS. 14A–14D, an illustration of HTML code is depicted in accordance with a preferred embodiment of the present invention. HTML file 1400 includes the setting of the background color and two line feeds in section 1402 in FIG. 14A. Six HTML links named Home, Products, Documentations, Records, Support, and Contact are centered in section 1404. A stylistic line stored as a graphics interface format (GIF) image is drawn next by the code in section 1406. A title "Employer Records" is added to the document in section 1408. All of these items are features that were not part of the table structure as displayed in FIG. 13.

In FIG. 14B, the employee record table entry for John Smith is shown. Column headings have been added along with double-lined borders in section 1410. Each of the data fields have the font specified, as shown for "lastname" in section 1412, "firstname" in section 1414, "serialnumber" in section 1416, "phone" in section 1418, and "email" in section 1420. The same fonts have been added for the second set of data for Judy Martin in section 1422 in FIG. 14C.

In FIG. 14D, a stylistic divider line appears next in section 1424 followed by a copyright notice in section 1426.

With reference now to FIGS. 15A and 15B, diagrams of an XSL stylesheet are depicted in accordance with a preferred embodiment of the present invention. Using initial XML file 900 in FIG. 9 and final HTML file 1400 in FIGS. 14A–14D, a XSL stylesheet is generated by identifying the difference between these two files. The addition of tags between HTML file 1100 in FIG. 11 and XML file 900 in FIG. 9 are identified and placed into XSL stylesheet 1500.

In XSL stylesheet 1500, initial section 1502 is the same as sections 1202 and 1204 in FIG. 12. The initial set of hyperlinks for Home, Products, Documentations, Records, Support, and Contact, the stylized line and the "Employer Records" title appear next in section 1504. The actual references for the hyperlinks are not part of the stylesheet but read from the file "trans2.html". The code in section 1506 includes the table borders, the column headings, and the table itself, followed by the stylized divider line and the copyright notice. The table data styles are shown in section 1508 in FIG. 15B. These are similar to the stylesheet entries shown in FIG. 12 except that the text font has been specified.

Figure 16:
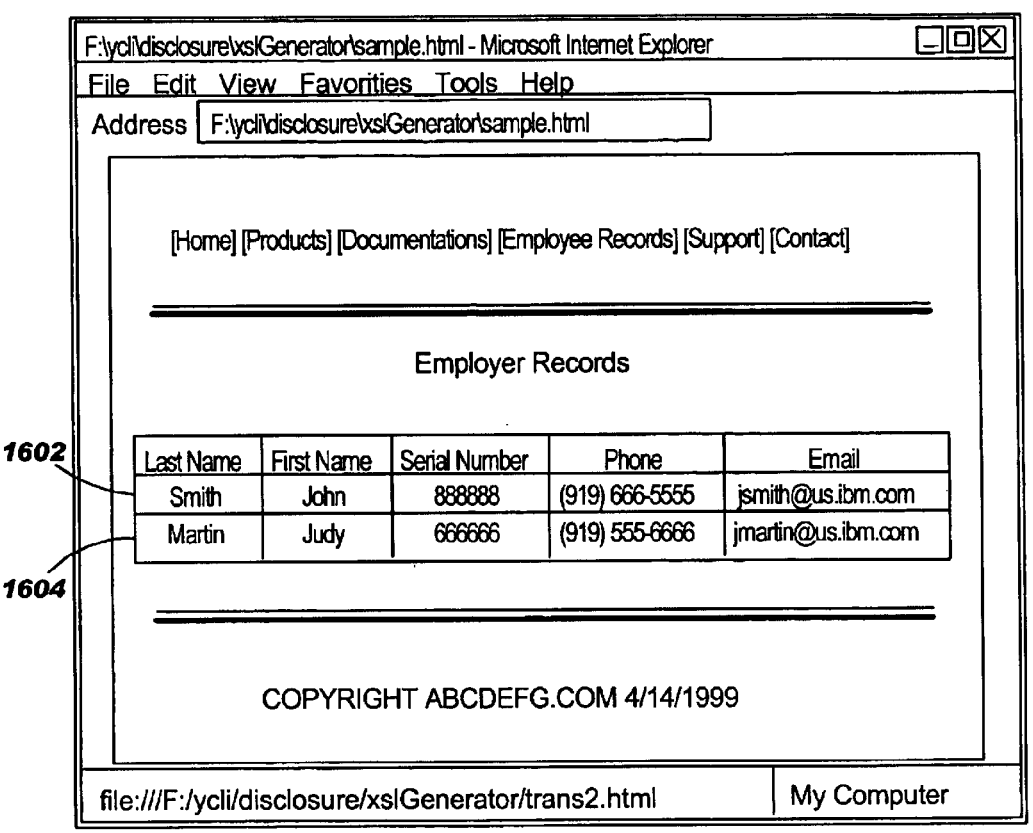
FIG. 16 is a diagram of a the employee data table with formatting using an XSL stylesheet depicted in accordance with a preferred embodiment of the present invention.

With reference now to FIG. 16, a diagram of a the employee data table with formatting using an XSL stylesheet is depicted in accordance with a preferred embodiment of the present invention. Window 1600 contains the formatting for the two records 1602 and 1604 for John Smith and Judy Martin. Window 1600 illustrates that using the XSL stylesheet generator process of the present invention does not limit the capability of the user to add formatting to obtain a customized result.

Thus, the present invention provides an improved method and apparatus for creating an XSL stylesheet by using an object conversion step and a presentation customization step as described above. The present invention allows the use of existing visual document authoring tools to customize a document prior to generation of the final XSL stylesheet. This mechanism allows generation of multiple XSL stylesheets without requiring users of the present invention to have knowledge of XSL. Further, the present invention maps a common customization experience for a user to multiple document styles automatically. The mechanism of the present invention as described above involves comparing the difference of before and after files to identify placement of proper XSL statements and to obtain values from XML tags.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted examples involve conversion to HTML files, the present invention may be applied to other conversions, such as a PDF file. The embodiment was chosen and described in order to best explain the principles of the invention the practical application and to enable others of ordinary skill in the art to understand the invention for various embodiments with various modifications as are suited to the particular use contemplated.

What is claimed is:

1. A method in a data processing system for creating a stylesheet, the method comprising the data processing system implemented steps of:

receiving input identifying a conversion of source elements into target elements;

displaying a presentation of an initial target document from a source document in a graphical user interface using the conversion of source elements and target elements;

receiving user input altering the presentation of the initial target document to form a target document;

responsive to the input, generating a first stylesheet to convert the source document into an intermediate source document;

responsive to generating the first stylesheet, creating the intermediate source document;

comparing the intermediate source document with the target document to identify changes in the presentation to form identified changes; and generating a second stylesheet based on the identified changes.

2. The method of claim 1 further comprising:

applying the first stylesheet and the second stylesheet to another source document to create another target document.

3. The method of claim 1 further comprising:

combining the first stylesheet and the second stylesheet to form a master stylesheet, wherein the master stylesheet is used to convert another source document into another target document.

4. The method of claim 1, wherein the input is user input in a graphical user interface.

5. The method of claim 1, wherein the first stylesheet is used to translate the source document into the intermediate source document containing intermediate tags.

6. The method of claim 1, wherein the initial target document is presented using a visual editor.

7. The method of claim 1, wherein the first stylesheet and the second stylesheet are extensible stylesheet language stylesheets.

8. The method of claim 1, wherein the intermediate source document is an extensible markup language document.

9. The method of claim 1, wherein the initial target document and final target document are hypertext markup language documents.

10. The method of claim 1, wherein the initial target document and final target document are portable document format documents.

11. A method in a data processing system for converting documents, the method comprising the data processing system implemented steps of:

identifying source elements and corresponding target elements;

presenting an initial target document derived from a source document using the source elements and corresponding target elements;

receiving user input modifying presentation of the initial target document to form a final target document;

identifying differences between the initial target document and the final target document; and creating a stylesheet to convert source documents into target documents using the identified source elements and corresponding target elements and the identified differences between the initial target document and the final target document.

12. The method of claim 11, wherein the initial target document is presented and the user input are received using a visual editor for the initial target document.

13. The method of claim 11, wherein the stylesheet is a extensible stylesheet language stylesheet.

14. The method of claim 11, wherein the target documents are hypertext markup language documents.

15. The method of claim 11, wherein the target documents are portable document format documents.

16. The method of claim 11, wherein the source documents are extensible markup language documents.

17. A data processing system for creating a stylesheet, the data processing system comprising:

first receiving means for receiving input identifying a conversion of source elements into target elements;

displaying means for displaying a presentation of an initial target document from a source document in a graphical user interface using the conversion of source elements and target elements;

second receiving means for receiving user input altering the presentation of the initial target document to form a target document;

first generating means, responsive to the input, for generating a first stylesheet to convert the source document into an intermediate source document;

creating means, responsive to generating the first stylesheet, for creating the intermediate source document;

comparing means for comparing the intermediate source document with the target document to identify changes in the presentation to form identified changes; and second generating means for generating a second stylesheet based on the identified changes.

18. The data processing system of claim 17 further comprising:

applying means for applying the first stylesheet and the second stylesheet to another source document to create another target document.

19. The data processing system of claim 17 further comprising:

combining means for combining the first stylesheet and the second stylesheet to form a master stylesheet, wherein the master stylesheet is used to convert another source document into another target document.

20. The data processing system of claim 17, wherein the input is user input in a graphical user interface.

21. The data processing system of claim 17, wherein the first stylesheet is used to translate the source document into the intermediate source document containing intermediate tags.

22. The data processing system of claim 17, wherein the initial target document is presented using a visual editor.

23. The data processing system of claim 17, wherein the first stylesheet and the second stylesheet are extensible stylesheet language stylesheets.

24. The data processing system of claim 17, wherein the intermediate source document is an extensible markup language document.

25. The data processing system of claim 17, wherein the initial target document and final target document are hypertext markup language documents.

26. The data processing system of claim 17, wherein the initial target document and final target document are portable document format documents.

27. A data processing system for converting documents, the data processing system comprising:

first identifying means for identifying source elements and corresponding target elements;

presenting means for presenting an initial target document derived front a source document using the source elements and corresponding target elements;

receiving means for receiving user input modifying presentation of the initial target document to form a final target document;

second identifying means for identifying differences between the initial target document and the final target document; and creating means for creating a stylesheet to convert source documents into target documents using the identified source elements and corresponding target elements and the identified differences between the initial target document and the final target document.

28. The data processing system of claim 27, wherein the initial target document is presented and the user input are received using a visual editor for the initial target document.

29. The data processing system of claim 27, wherein the stylesheet is a extensible stylesheet language stylesheet.

30. The data processing system of claim 27, wherein the target documents are hypertext markup language documents.

31. The data processing system of claim 27, wherein the target documents are portable document format documents.

32. The data processing system of claim 27, wherein the source documents are extensible markup language documents.

33. A computer program product in a computer readable medium for creating a stylesheet, the computer program product comprising:

first instructions for receiving input identifying a conversion of source elements into target elements;

second instructions for displaying a presentation of an initial target document from a source document in a graphical user interface using the conversion of source elements and target elements;

third instructions for receiving user input altering the presentation of the initial target document to form a target document;

fourth instructions, responsive to the input, for generating a first stylesheet to convert the source document into an intermediate source document;

fifth instructions, responsive to generating the first stylesheet, for creating the intermediate source document;

sixth instructions for comparing the intermediate source document with the target document to identify changes in the presentation to form identified changes; and seventh instructions for generating a second stylesheet based on the identified changes.

34. A computer program product in a computer readable medium for converting documents, the computer program product comprising:

first instructions for identifying source elements and corresponding target elements;

second instructions for presenting an initial target document derived from a source document using the source elements and corresponding target elements;

third instructions for receiving user input modifying presentation of the initial target document to form a final target document;

fourth instructions for identifying differences between the initial target document and the final target document; and fifth instructions for creating a stylesheet to convert source documents into target documents using identified source elements and corresponding target elements and identified differences between the initial target document and the final target document.

* * * * *